Figure 1:
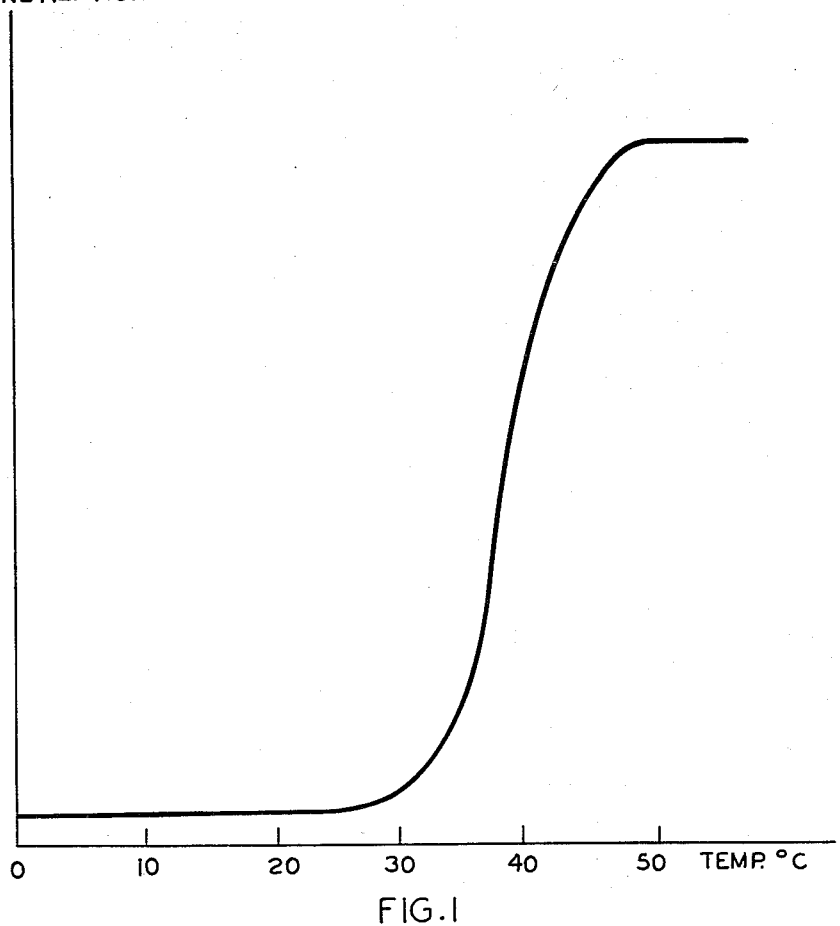

July 27, 1965   E. W. YETTER   3,197,003
TEMPERATURE-RESPONSIVE CLUTCH OR BRAKE
Filed Oct. 13, 1960   2 Sheets-Sheet 2
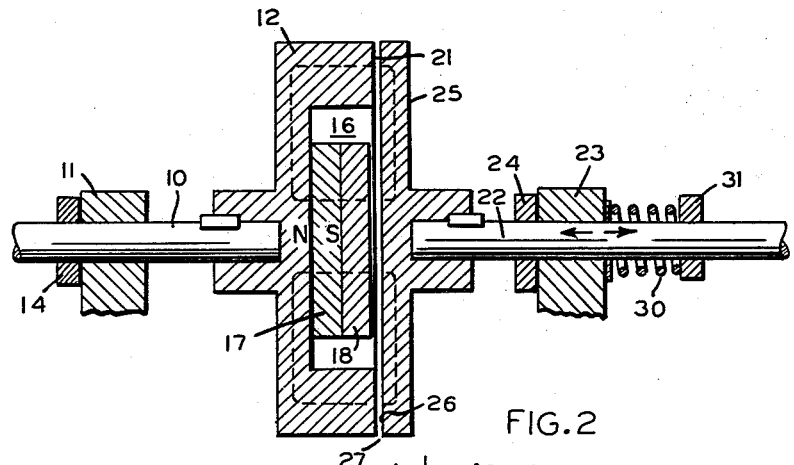
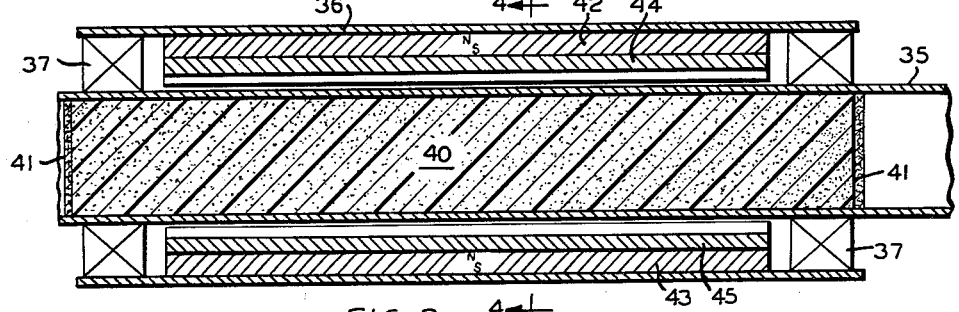
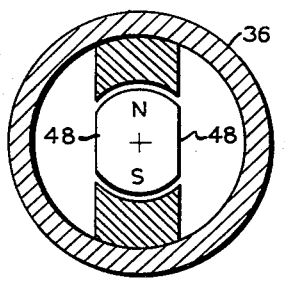
FIG.5
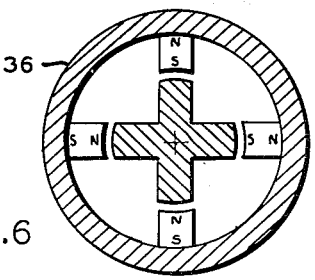
FIG.6
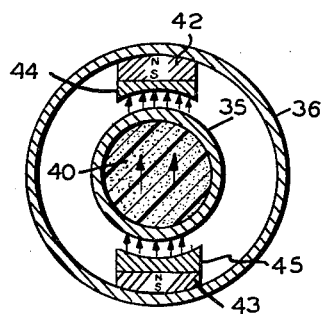
FIG.4
*INVENTOR.*
EDWARD W. YETTER
BY Harry J. McCauley
ATTORNEY

United States Patent Office 3,197,003
Patented July 27, 1965

---

3,197,003
TEMPERATURE-RESPONSIVE CLUTCH OR BRAKE
Edward W. Yetter, West Chester, Pa., assignor to E. I. du Pont de Nemours and Company, Wilmington, Del., a corporation of Delaware
Filed Oct. 13, 1960, Ser. No. 62,488
6 Claims. (Cl. 192—84)

This invention relates to a force coupling, and particularly to a temperature-responsive rotary force coupling useful in clutch, brake and similar applications.

Permeability variation with temperature has hitherto been utilized in the case of magnetic materials in the vicinity of their Curie points as taught in U.S. Patent 1,761,764. However, the temperature response characteristics have been limited in both temperature region and range and, consequently, the principle has not had much exploitation in the art.

It is an object of this invention to provide a temperature-responsive rotary force coupling, and especially such a coupling which is adapted to operation at temperatures ranging from near absolute zero to several hundred degrees centigrade. It is another object of this invention to provide a rotary force coupling of a type adapted to a relatively wide design range in terms of the physical arrangements of driving and driven members as well as a coupling which is economical in first cost and maintenance. The manner in which these and other objects of this invention are attained will become clear from the following detailed description and the drawings, in which:

FIG. 1 is a typical curve of Temperature v. Magnetization for an antimonide composition having a variable permeability adapting it to utilization as a magnetic transition material in the force couplings of this invention, FIG. 2 is a longitudinal sectional view of a preferred embodiment of coupling according to this invention utilizing frictional driving surfaces between the members to effect a clutch action, FIG. 3 is a longitudinal sectional view of another embodiment of coupling wherein frictional drive surfaces are dispensed with, FIG. 4 is a transverse sectional view taken on line 4—4, FIG. 3, FIG. 5 is a transverse sectional view of a variation of the embodiment of coupling of FIGS. 3 and 4, and FIG. 6 is a transverse sectional view of a 4-pole variation of coupling according to FIGS. 3–5, inclusive.

Generally, this invention consists of a rotary force coupling comprising in combination a pair of relatively rotatable elements to be coupled disposed adjacent one another in a common magnetic flux path, a permanent magnet and a substance which displays a change in permeability accompanying a reversible first-order transition from a first solid state phase to a second solid state phase at a given temperature both disposed in said common magnetic flux path, the permanent magnet and the substance together completing a magnetic flux circuit between the elements of the pair coupling one of the elements with the other during the time that the substance exists in its first solid state phase, and uncoupling the elements of the pair when the substance exists in its second solid state phase.

The substances employed as the temperature-responsive media in the force couplings of this invention are possessed of the characteristics of changing in magnetic state with temperature from paramagnetic or antiferromagnetic on the one hand to ferromagnetic or ferrimagnetic on the other in the course of a first-order transition from one solid state phase to another solid state phase. Materials especially useful as temperature-responsive substances in my force couplings are those described in U.S. Patents 3,126,347 and 3,126,492 of T. J. Swoboda. These materials are comprised of at least two transition elements selected from the B families of Groups V–VII of the Periodic Table (refer Deming "General Chemistry," John Wiley & Sons, Inc., 5th Ed., Chapter 11) in total amount of 35–95 atom percent, at least one of said transition elements being selected from the first row elements of said B families, a total of from 5–40 atom percent of at least one element of Group V–A, and 0–30 atom percent of at least one element of Groups II–IV of the Periodic Table, and have a maximum saturation induction at a temperature lying intermediate absolute zero and the Curie point.

Such compositions are produced by heating mixtures of the elements in the desired proportions to temperatures between about 600–1050° C. Specific compositions containing 35–95 atom percent of the transition elements, with one said transition element being selected from the first row elements of said B families, and a total of from 5–40 atom percent of at least one element of Group V–A exhibit the first-order phase transition within a temperature range, e.g., absolute zero to +200° C., which is particularly desirable for a large number of common applications. Compositions containing essentially four chemical elements have functioned well as temperature-responsive substances. Such quaternary compositions usually contain 5–35 atom percent antimony, 35–70 atom percent manganese, 0.8–25 atom percent of at least one of the metals chromium and vanadium, and 0–30 atom percent of at least one of the elements of Groups II–IV of the Periodic Table, especially gallium, indium, cadmium, lead, thallium, tin, zirconium, scandium, yttrium, magnesium, and zinc, the percentages being so chosen as to total 100 percent.

The foregoing compositions are examples of materials which undergo a first-order solid-phase-to-solid-phase transition upon the application of heat, traversal of the transition being, in this case, accompanied by a change from the non-magnetic to the magnetic state. However, yet other substances which meet the general requirements hereinbefore set forth are also useful. The described materials display a relatively high rate of change of magnetization with temperature as compared with all other known substances and thus are especially suited to the uses contemplated by this invention. Thus, referring to FIG. 1, there is shown a Magnetization-Temperature curve for the composition:

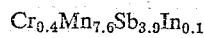

$$Cr_{0.4}Mn_{7.6}Sb_{3.9}In_{0.1}$$

This corresponded to a permeability variation ranging from unity to about 20–30 throughout the same temperature range, which was entirely adequate for satisfactory force coupling operation.

In a magnetic circuit, the force applied across an air gap existing therein can be expressed as $F = kB^2$, where $B =$ flux density and $k$ is a constant depending upon the geometry of the circuit. However, the flux density, B, is proportional to the applied magnetic field, which can typically be furnished by a permanent magnet, so that $B = \mu H$ where $\mu =$ effective permeability and $H =$ magnetic field. Thus, force is related as follows: $F = kH^2\mu^2$.

In a magnetic circuit containing soft iron, an air gap and a temperature-responsive magnetic transition insert of a substance such as one of those hereinbefore described, (1) the iron has no appreciable control over the flux density because of the fact that its permeability is so high that it functions essentially as a flux guide, (2) the air gap (permeability=1) furnishes a fixed reluctance in the circuit and is a major factor in determining flux density and (3) the magnetic transition insert, because of its relatively low maximum permeability of 20–30, for example, constitutes a second controlling factor for flux density. Since the permeability of the magnetic transition insert is a function of temperature, $\mu = f(T)$, the total force applied across the air gap of a magnetic circuit can be expressed as $F=kH^2\mu^2=k_1f^2(T)$ where H is assumed to be constant, as is usually the case. This principle is applicable to force couplings constructed according to this invention.

Referring to FIG. 2, there is shown a preferred embodiment of rotary force coupling intended to function as a clutch. In this construction 10 is arbitrarily assumed to be the rotating driving shaft, which is power-driven from a suitable motor, not shown, and the power delivery end of which is journaled in a bearing 11 and provided with a thrust collar 14. Shaft 10 is fitted with a soft steel rotor 12 keyed thereto which is provided with a shallow bore 16 on the outboard side. Within bore 16 is fixedly mounted concentric with shaft 10 a permanent magnet 17, which may be one of the ferrites or an equivalent known to the art, and this has attached to it, as by cementing or bolt attachment, a piece of the temperature-responsive magnetic transition material 18. It will be noted that the outside face of disk 18 lies slightly within the limiting plane including the outboard annular face 21 of rotor 12, so that the latter is solely available as the frictional driving surface of the clutch and is preferably faced with material having a high coefficient of friction coupled with wear resistance, not detailed.

The driven shaft of the apparatus is indicated as 22, rotatably supported in bearing 23 provided with thrust collar 24. Shaft 22 is provided at its outboard end with a circular disk 25 keyed thereto, the face 26 of which opposed to 21 is likewise adapted to be a frictional driving surface. Shaft 22 is fitted in bearing 23 with a limited amount of axial freedom so that, in the disengaged clutch position depicted in FIG. 2, frictional surface 26 will be biased rightwards out of contact with surface 21, leaving a small clearance 27 of, typically, about 5–10 mils. The disengagement action is afforded by compression spring 30 interposed between the inside face of bearing 23 and collar 31 attached to the shaft.

In operation, when the piece 18 of magnetic transition material is at a temperature corresponding to its nonmagnetic state, and therefore possesses low permeability to flux flow, the path of which is indicated in broken lines in FIG. 2, spring 30 easily overcomes the force applied by magnet 17 across the air gap inclusive of clearance 27, and the clutch remains disengaged. However, when the temperature of 18 reaches a value corresponding to its magnetic state, the permeability increases abruptly and the magnetic force of 17 overcomes spring 30, thereby throwing the clutch into engagement, a condition in which it remains until the temperature again changes to a degree permitting reversion of the magnetic transition material 18 to its original state.

Obviously, a simple reversed arrangement of parts permits construction of a clutch which remains disengaged during the period for which there is engagement in the design of FIG. 2, and, similarly, engaged instead of the opposite condition for the apparatus shown.

One application for the clutch of FIG. 2 is as a cooling fan drive for an internal combustion engine, such as in automobiles, as an example. When the engine temperature is low, such as might be true in cold weather operation, or, at least intermittently, under the draft of cooling air impelled past the engine incident to automobile motion, there is no need for fan operation and the fan can therefore be cut out by the temperature-responsive clutch. On the other hand, when the temperature starts to rise to a potentially harmful level, the clutch throws in and the fan is driven by direct connection with the engine power for as long as the high temperature condition persists.

An apparatus built according to FIG. 2 was interposed in the driving circuit between a small centrifugal blower used as the load and an A.-C. motor used to drive it. An antimonide magnetic transition wafer 18 having its transition temperature at approximately 45° C. was utilized in the construction and a projection lamp was employed as the heat source. Wafer 18, in this apparatus, was a single crystal of the composition: Cr 2.25%, Mn 45.62%, Sb 52.01%, and In 0.12% measuring approximately ½" square and 0.1" thick. This antimonide composition displays a marked preferential magnetization along its c-axis and, accordingly, the crystal was oriented with its c-axis in prolongation with the magnetic flux path, i.e., in the direction of the thickness of the wafer as seen in FIG. 2. Cyclic clutch operation in highly constant relationship with temperature was obtained by alternately exposing the magnetic transition wafer to the heat of the lamp and then cutting off the lamp radiation. This apparatus was also used to demonstrate the force coupling necessary to braking operation but, in this case, the driven shaft was clamped stationary. Under these circumstances, when the magnetic transition wafer temperature reached 45° C., the friction faces 21 and 26 were brought into contact, which stalled the drive motor.

It will be understood that the friction driving surfaces may, of course, be disposed in radial line from the center of rotation for two relatively rotatable elements disposed concentric one to another and that the pair of elements to be coupled thus do not have to be axially aligned with respect to each other as shown for the specific embodiment of FIG. 2.

It is also possible to construct a clutch or brake according to this invention which dispenses with frictional contact altogether. Preferably, this can be accomplished by disposing the permanent magnet and the magnetic transition material on individual ones of the pair of elements as to which relative rotation is desired and providing effective magnetic poles in each which interact to create a driving torque. However, if desired, both the permanent magnet and the magnetic transition material can be disposed on the same element of the pair to be coupled provided both are in the common magnetic flux path and, provided further, that opposed junctures of the flux path integral with each of the relatively rotatable elements are shaped relative one another to constitute effective magnetic poles in each for the interaction manifested as the driving torque.

It is fundamental that a magnetic body free to move in a magnetic field aligns itself so as to decrease the total reluctance of the magnetic circuit to the practicable minimum. The magnitude of the torque tending to align a magnetic body of moment M in a field H is $L=MH \sin \alpha$, where $\alpha$ is the angle of inclination of the body with respect to the applied magnetic field.

It happens that a magnetic transition material which is magnetically anisotropic, such as the antimonide composition hereinbefore described, is especially advantageous for the construction of apparatus according to this invention, because there is thereby afforded an additional asymmetry in the form of anisotropy as well as the geometric asymmetry obtainable by design configuration. The characteristic of magnetic anisotropy is deliberately utilized to provide a pole structure as regards the inner coupled member of the embodiment of apparatus shown in FIGS. 3 and 4. Here the driving shaft 35 is a tubular stainless steel (non-magnetic) shaft mounted for rotation in conventional bearings not shown. The driven shaft 36 is a carbon steel tube, mounted concentrically with respect to driving shaft 35 by the bearings represented schematically at 37. The internal bore of 35 is filled with a mass of temperature-responsive magnetic transition substance 40 which, in this instance, can be powdered material 20–60 mesh size having the composition of the material possessing the temperature-magnetization characteristics of FIG. 1 potted in an epoxy resin binder. This antimonide composition also displays a marked preferential magnetization along its c-axis, so that it is desirable to orient it in order to obtain the best results in service. This orientation, which also sets up the equivalent of poles on the inside component to be coupled, is accomplished by heating the mixture of powder and binder above the transition temperature of the powder after shaft 35 is filled, retaining the mass in place by circular friction-retained fiber sealing rings 41. Then the packed shaft is interposed between the poles of a high intensity electromagnet to align the particles in a plane transverse to shaft 35, and the binder allowed to set.

The permanent magnet elements of the apparatus consist of long pieces of ferrite, or the like, designated 42 and 43, oppositely oriented one from another in a magnetic sense as indicated by the magnetic pole designations in FIGS. 3 and 4, which are cemented or otherwise firmly attached to the inside surfaces of shaft 36 180° apart from one another. The angular expanse of these magnets is preferably limited to not in excess of about 45–60°, referred to a complete rotation of shaft 36, in order to obtain the best torque transmission. The inward ends of magnets 42 and 43 are capped by soft iron pole pieces 44 and 45, respectively, cemented thereto, which pieces are adapted to narrow the air gap existing in the magnetic flux path. Pole pieces 44 and 45 are machined to present concave faces concentric with the outer circumference of driving shaft 35 as a further measure in reducing the reluctance conferred by the air gap.

The operation of the apparatus of FIGS. 3 and 4 is similar in all respects to that of the apparatus of FIG. 2, except that the direction of the magnetizing field is now transverse as indicated by the arrows, FIG. 4. The coupling of the second embodiment is thus via the agency of magnetic forces solely, without the interposition of a friction drive intermediary.

It will be understood that, should an isotropic material be employed as the magnetic transition material, the equivalent of poles on the inside component is readily achieved by machining flat two opposite sides of the inside component to the extent of about one-fourth a radius as shown at 48 in FIG. 5, in which case the outside component can be identical with that shown in FIGS. 3 and 4. On the other hand, it may be desirable for mechanical strength or other considerations to utilize as the inside component the strong, rigid permanent magnet material. This can be readily accomplished by forming the inside component in the configuration of FIG. 5 but out of permanently magnetic material, whereas the poles on the outside component are then fabricated from magnetic transition material, which can be pre-oriented if necessary, again in the shape shown in FIG. 5. It is possible, of course, to provide more than two cooperating pole pairs on each of the inside and outside components, respectively, and a typical construction consists of four poles on each disposed 90° apart one from another as shown in FIG. 6. A 4-pole construction affords a greater driving torque and thus is particularly preferred in some installations.

It will be understood that either one or both of the elements coupled can be independently rotatable and the term "relatively rotatable elements," as employed in the claims, is intended to cover both of these situations.

Since it is apparent that this invention is subject to relatively wide modification without departure from its essential spirit, it is intended to be limited only by the scope of the following claims.

I claim:

1. A rotary force coupling comprising in combination a pair of relatively rotatable elements to be coupled carried by supports spaced a fixed distance apart, said pair of relatively rotatable elements being disposed adjacent one another in a common magnetic flux path, a permanent magnet and a substance having a Curie point which displays, at temperatures below said Curie point, a change in permeability accompanying a first-order transition from a first solid state phase to a second solid state phase at a given temperature, both said permanent magnet and said substance being permanently disposed in said common magnetic flux path, said permanent magnet and said substance together completing a magnetic flux circuit between said elements of said pair coupling one of said elements with the other of said elements during the time that said substance exists in said first solid state phase and uncoupling said elements of said pair when said substance exists in said second solid state phase.

2. A rotary force coupling according to claim 1 wherein said substance consists essentially of at least two transition elements from the B families of Groups V–VII of the Periodic Table in total amount of 35–95 atom percent, at least one of said transition elements being selected from the first row elements of said B families, a total of from 5–40 atom percent of at least one element of Group V–A, and 0–30 atom percent of at least one element of Groups II–IV of the Periodic Table.

3. A rotary force coupling according to claim 1 wherein said substance consists essentially of antimony in the amount of 5–35 atom percent, at least two transition elements from the B families of Groups V–VII of the Periodic Table, at least one of said transition elements being selected from the front row elements of said B families, in the amount of 39–95 atom percent, and not in excess of 30 atom percent of an element selected from the group consisting of cadmium, gallium, indium, lead, magnesium, scandium, thallium, tin, yttrium, zinc, and zirconium.

4. A rotary force coupling comprising in combination a pair of relatively rotatable elements to be coupled carried by supports spaced a fixed distance apart, said pair of relatively rotatable elements being disposed adjacent one another in substantially concentric relationship in a common magnetic flux path, a permanent magnet and a substance having a Curie point which displays, at temperatures below said Curie point, a change in permeability accompanying a first-order transition from a first solid state phase to a second solid state phase at a given temperature both said permanent magnet and said substance being permanently disposed in said common magnetic flux path and constituting, together, adjacent, opposed junctures of said magnetic flux path integral with each of said relatively rotatable elements of said pair shaped so as to define the configuration of said flux path in a pattern transmitting torque from the driving element to the driven element of said pair of relatively rotatable elements.

5. A rotary force coupling comprising in combination a pair of relatively rotatable elements to be coupled carried by supports spaced a fixed distance apart, said pair of relatively rotatable elements being disposed adjacent one another in substantially concentric relationship in in a common magnetic flux path, a permanent magnet fixedly attached to one of said elements of said pair and a substance having a Curie point which displays, at temtures below said Curie point, a change in permeability accompanying a first-order transition from a first solid state phase to a second solid state phase at a given temperature fixedly attached to the other one of said elements of said pair, said permanent magnet and said substance being shaped relative one another so as to define the configuration of said flux path in a pattern transmitting torque from the driving element to the driven element of said pair of relatively rotatable elements.

6. A rotary force coupling comprising in combination a pair of relatively rotatable elements to be coupled carried by supports spaced a fixed distance apart, said pair of relatively rotatable elements being disposed adjacent one another in a common magnetic flux path, a permanent magnet and a substance having a Curie point which displays, at temperatures below said Curie point, a change in permeability accompanying a first-order transition from a first solid state phase to a second solid state phase at a given temperature both said permanent magnet and said substance being permanently disposed in said common magnetic flux path, opposed friction driving surfaces on each side of said elements, said permanent magnet biasing said friction driving surfaces into a first coupling condition with respect to one another when said substance exists in said first solid state phase completing a magnetic flux circuit between said permanent magnet and said substance, and means biasing said friction surfaces into a second coupling condition opposite in sense to said first coupling condition when said substance exists in said second solid state phase.

References Cited by the Examiner

UNITED STATES PATENTS

| | | |
|---|---|---|
| 1,601,791 | 10/26 | Bing. |
| 2,147,204 | 2/39 | Laird. |
| 2,299,155 | 10/42 | Lange _____ 236—88 |
| 2,650,684 | 9/53 | English et al. _____ 192—21.5 |
| 2,845,157 | 7/58 | Gambell _____ 192—21.5 |
| 2,847,101 | 8/58 | Bergmann _____ 192—21.5 |
| 2,890,356 | 6/59 | Noodleman _____ 310—105 |
| 2,908,833 | 10/59 | Sturzenegger _____ 310—105 |
| 2,955,692 | 10/60 | Thomas _____ 192—84 |
| 2,962,143 | 11/60 | Heinemann. |

FOREIGN PATENTS 908,214    4/54    Germany.

DAVID J. WILLIAMOWSKY, *Primary Examiner.*

THOMAS HICKEY, *Examiner.*